(12) United States Patent  (10) Patent No.: US 8,038,213 B2
Owens  (45) Date of Patent: Oct. 18, 2011

(54) SYSTEM AND METHOD FOR A CHILD SAFETY SEAT HAVING SENSING AND NOTIFICATION ABILITIES

(76) Inventor: Chelsea Owens, Dallas, TX (US)

( * ) Notice: Subject to any disclaimer, the term of this patent is extended or adjusted under 35 U.S.C. 154(b) by 244 days.

(21) Appl. No.: 12/238,969

(22) Filed: Sep. 26, 2008

(65) Prior Publication Data

US 2010/0078978 A1 Apr. 1, 2010

(51) Int. Cl.
*A47C 1/08* (2006.01)
*A47C 7/62* (2006.01)
(52) U.S. Cl. .................................. 297/250.1; 297/217.3
(58) Field of Classification Search ............... 297/217.3, 297/250.1, 217.4
See application file for complete search history.

(56) References Cited

U.S. PATENT DOCUMENTS

| | | | |
|---|---|---|---|
| 6,104,293 A * | 8/2000 | Rossi | 340/573.1 |
| 6,922,147 B1 * | 7/2005 | Viksnins et al. | 340/573.1 |
| 6,924,742 B2 * | 8/2005 | Mesina | 340/573.1 |
| 6,930,614 B2 * | 8/2005 | Rackham et al. | 340/686.1 |
| 7,009,522 B2 * | 3/2006 | Flanagan et al. | 340/666 |
| 7,106,203 B2 * | 9/2006 | Edwards et al. | 340/573.1 |
| 7,230,530 B1 * | 6/2007 | Almquist | 340/539.15 |
| 7,250,869 B2 * | 7/2007 | Davis | 340/573.1 |
| 7,348,880 B2 * | 3/2008 | Hules et al. | 340/522 |
| 7,714,737 B1 * | 5/2010 | Morningstar | 340/667 |
| 7,726,736 B1 * | 6/2010 | Grago et al. | 297/250.1 |
| 2007/0075574 A1 * | 4/2007 | James | 297/217.3 |
| 2008/0136633 A1 * | 6/2008 | Moss | 340/568.1 |

* cited by examiner

*Primary Examiner* — Sarah B McPartlin
(74) *Attorney, Agent, or Firm* — Baker Botts L.L.P.

(57) ABSTRACT

A child safety seat system having sensing and notification abilities includes a child safety seat, a proximity sensor, a presence sensor, and a transmitter. The proximity sensor is configured to detect when a wireless receiver is located outside a predefined distance of the child safety seat. The presence sensor is configured to detect presence of a person in the child safety seat. The transmitter is configured to transmit a wireless signal to the wireless receiver when the presence sensor detects the presence of a person in the child safety seat and the wireless receiver is located outside the predefined distance. Furthermore, the wireless signal configured to cause the wireless receiver to generate an alert.

10 Claims, 1 Drawing Sheet

SYSTEM AND METHOD FOR A CHILD SAFETY SEAT HAVING SENSING AND NOTIFICATION ABILITIES

TECHNICAL FIELD

The present disclosure relates generally to child safety systems and more particularly to a system and method for a child safety seat having sensing and notification abilities.

BACKGROUND

During the course of a year, outdoor temperature may vary from extremely cold to exceedingly warm. When a vehicle is parked outdoors, the temperature in the vehicle's cabin may approach or even exceed, over time, the temperature outside of the vehicle. Extreme temperatures such as those found in a vehicle's cabin after being parked outdoors may lead to serious injury, or even death, of a child who is inadvertently left unattended in the vehicle, for example, as a passenger in a child safety seat. Consequently, there is a need for a child safety seat that may lessen or eliminate the risk of fatality or injury to a child left unattended in a vehicle's interior as a passenger in a child safety seat.

SUMMARY

In particular embodiments, the present disclosure provides for a system and method for a child safety seat having sensing and notification abilities. A child safety seat system having sensing and notification abilities includes a child safety seat, a proximity sensor, a presence sensor, and a transmitter. The proximity sensor may be configured to detect when a wireless receiver is located outside a predefined distance of the child safety seat. The presence sensor may be configured to detect presence of a person in the child safety seat. The transmitter may be configured to transmit a wireless signal to the wireless receiver when the presence sensor detects the presence of a person in the child safety seat and the wireless receiver is located outside the predefined distance. Furthermore, the wireless signal may be configured to cause the wireless receiver to generate an alert.

In particular embodiments, the present disclosure provides for a method of using a child safety seat system. In particular embodiments the method for using the child safety seat system includes detecting when a wireless receiver is located outside a predefined distance of the child safety seat using a proximity sensor and detecting a presence of a person in the child safety seat using a presence sensor. When the presence sensor detects the presence of a person in the child safety seat and the wireless receiver is located outside the predefined distance, a wireless signal is transmitted to the wireless receiver using a transmitter, the wireless signal configured to cause the wireless receiver to generate an alert.

Technical advantages of particular embodiments of the present disclosure may include providing a system and method for a child safety seat whereby the child safety seat includes a temperature control unit, comprising a thermoelectric module, that is operable to adjust the temperature of a child safety seat when the temperature sensor detects a temperature that falls outside of a predetermined temperature range. This technical advantage may lessen or eliminate the risk of fatality or injury to a child inadvertently left unattended in a child safety seat by countering a shift in the vehicle's cabin temperature. Another technical advantage of particular embodiments of the present disclosure may allow for the child safety seat to determine whether a child has been left unattended and, if so, to communicate an alert message to a device commonly carried by a caregiver to inform the caregiver to check the child safety seat.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Figure 1:
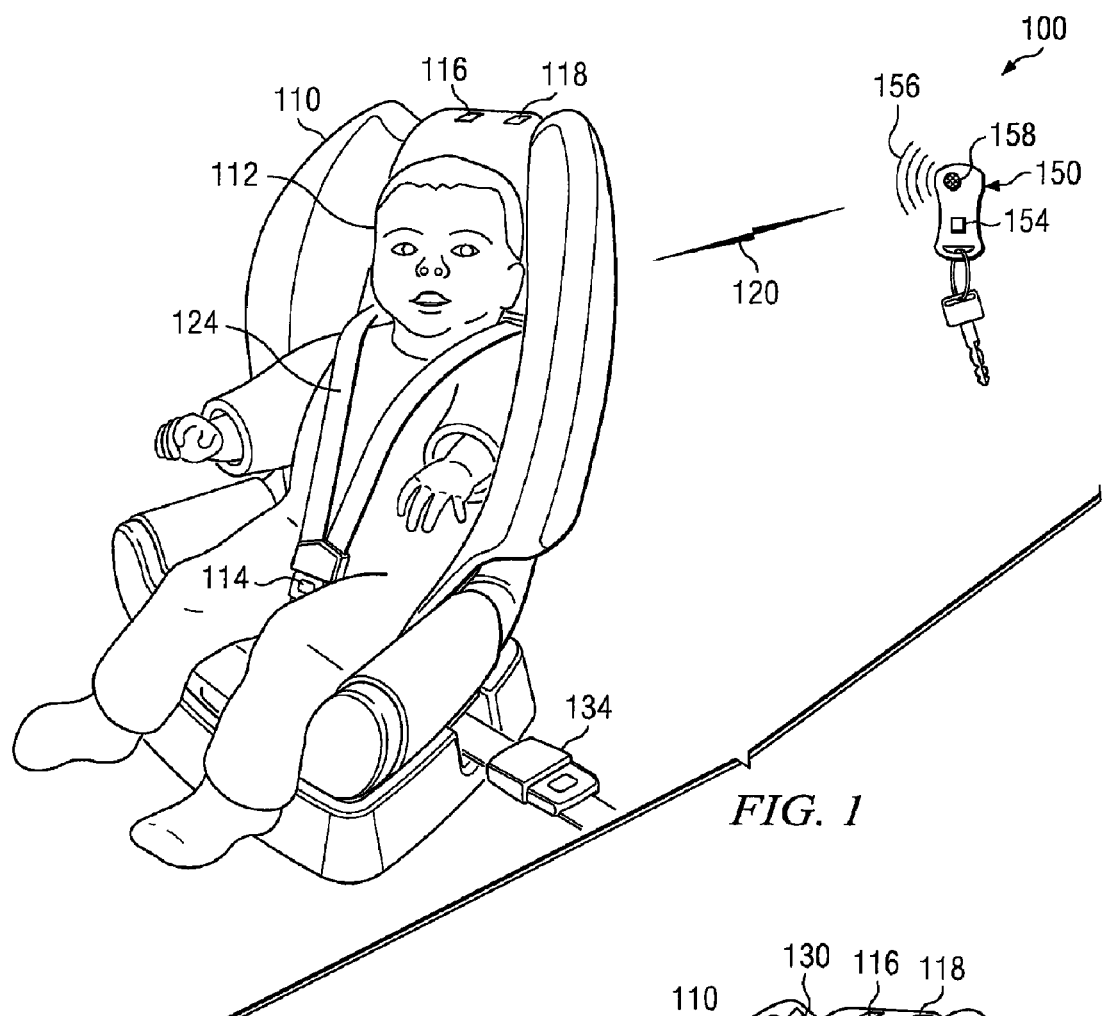
FIG. 1 illustrates an example system for a child safety seat having sensing and notification abilities according to an example embodiment of the present disclosure.

FIG. 1 illustrates a system 100 for a child safety seat having sensing and notification abilities according to an example embodiment of the present disclosure. System 100 includes a child safety seat 110 and a wireless receiver 150 operable to wirelessly communicate with child safety seat 110. In a typical situation, child safety seat 110 may be used as a restraining device to secure a child 112 or other small person to a seat of a vehicle. For example, child safety seat 110 may be secured to the vehicle's seat using, for example, a seat belt 134 of the vehicle. Once child safety seat 110 has been secured to the vehicle's seat, a caregiver to child 112, such as a parent, may place child 112 into child safety seat 110 and secure child 112 into child safety seat 110 using a restraint 124 of child safety seat 110.

The caregiver may carry wireless receiver 150 for use with child safety seat 110. Wireless receiver 150 may alert the caregiver to check child safety seat 110, for example if the caregiver accidentally leaves child 112 unattended in child safety seat 110. In an example situation, when child safety seat 110 determines that child 112 has been left unattended in child safety seat 110, child safety seat 110 may send a wireless signal 120 to wireless receiver 150 to notify the caregiver that child 112 has been left unattended in child safety seat 110.

Child safety seat 110 may be any seating device used to safely restrain a person during a vehicle ride. As an example and not by way of limitation, child safety seat 110 may be a forward facing seat, a backward facing seat, a child car seat, a booster seat, or any other suitable seating device capable of safely restraining a person during a vehicle ride.

To enable child safety seat 110 to determine a proximity of the caregiver to child safety seat 110, child safety seat 110 may include a proximity sensor 116. Proximity sensor 116 may be any component of hardware or software or combination of two or more such components operable to determine when wireless receiver 150 is located outside of a predefined distance of child safety seat 110.

As an example and not by way of limitation, proximity sensor 116 may operate with a sensor tag 154 in wireless receiver 150 to determine when wireless receiver 150 is located outside a predefined distance of child safety seat 110. By way of example and not limitation, proximity sensor 116 may communicate with sensor tag 154 by wired, wireless, or mechanical means to enable proximity sensor 116 to determine when sensor tag 154 is located outside a predefined distance of child safety seat 110. For example, the predefined distance may be a user-defined quantity that a user may configure before operation of system 100. In particular embodiments, proximity sensor 116 may be placed in, on, or near child safety seat 110 and sensor tag 154 may be placed in, on, or near wireless receiver 150. If proximity sensor 116 and sensor tag 154 become separated by a distance greater than a predefined distance (e.g., ten feet), proximity sensor 116 may determine that the caregiver has left the vicinity of child safety seat 110 and may instruct child safety seat 110 to issue wireless signal 120 to wireless receiver 150 if child safety seat 110 further determines that child 112 is present in child safety seat 110 using a presence sensor 114 as described in more detail with respect to FIG. 2.

To communicate with wireless receiver 150, child safety seat 110 may include a transmitter 118. Transmitter 118 may be any component of hardware or software or combination of two or more such components operable to wirelessly communicate with wireless receiver 150 directly or indirectly, such as for example, through one or more intervening components such as through a network. As an example and not by way of limitation, transmitter 118 may communicate with wireless receiver by sending a wireless signal 120 including, but not limited to, radio frequency ("RF"), microwave, and infrared wave signals to wireless receiver 150. In particular embodiments, the transmitter 118 may be a cellular communications device capable of connecting to a cellular network and transmitting a cellular signal such as a text message or audio message to wireless receiver 150 through the cellular network.

Wireless receiver 150 may be any component of hardware or software or combination of two or more such components operable to receive wireless signal 120 from transmitter 118. As an example and not by way of limitation, wireless receiver 150 may be a cellular device, a two-way radio device, a keychain device or any other suitable device operable to receive wireless signal 120. In particular embodiments, wireless receiver 150 may also be capable of generating an alert 156 when wireless signal 120 is received which may instruct the caregiver to check child safety seat 110. By way of example and not limitation, alert 156 may be an audible sound projected from a speaker 158 on wireless receiver 150, a vibration caused by the wireless receiver 150, illumination of a light on the wireless receiver 150, a text or multimedia message displayed on wireless receiver 150, a phone call received by the wireless receiver 150 with an instruction to check child safety seat 110, or any other suitable alert mechanism or combination of alert mechanisms operable to attract the attention of a person who is in possession of the wireless receiver 150.

Typically, wireless receiver 150 may be any suitable device carried by the caregiver. By way of example and not limitation, the wireless receiver 150 is shown as a keychain fob, but could also be, for example, a bracelet, a cellular communications device such as a cell phone or a personal digital assistant ("PDA"), or any other device capable of communicating wirelessly with transmitter 118.

In particular embodiments, child safety seat 110 may further include an escalation feature operable to notify additional people if the caregiver does not return within a predetermined amount of time to check child safety seat 110 after being alerted to check child safety seat 110 by wireless receiver 150. Child safety seat 110 may determine that the caregiver has returned, for example, by sensing the presence of wireless receiver 150 as the caregiver approaches child safety seat 110. However, if the caregiver does not return within a predetermined amount of time, child safety seat 110 may instigate a series of notification measures of increasing magnitude as more and more time passes.

For instance, if the caregiver does not return after a predetermined amount of time, child safety seat 110 may attempt to draw the attention of passers-by, for example, by setting off the alarm of the vehicle or by playing an audible alert through a speaker incorporated into child safety seat 110. Alternatively or in addition, child safety seat 110 may summon emergency services, such as for example, by calling 911 with a prerecorded message indicating child 112 may have been left inadvertently unattended in child safety seat 110 and including a position of child safety seat 110 as determined, for example, by an onboard GPS system either in the vehicle or in child safety seat 110. One of ordinary skill in the art will appreciate that the above-described escalation notification measures were presented for the sake of explanatory clarification and will further appreciate that the present disclosure contemplates using any suitable notifications measures to notify any suitable people if the caregiver does not return to check on child safety seat 110 within a predetermined amount of time after being alerted to check child safety seat 110 by wireless receiver 150.

Figure 2:
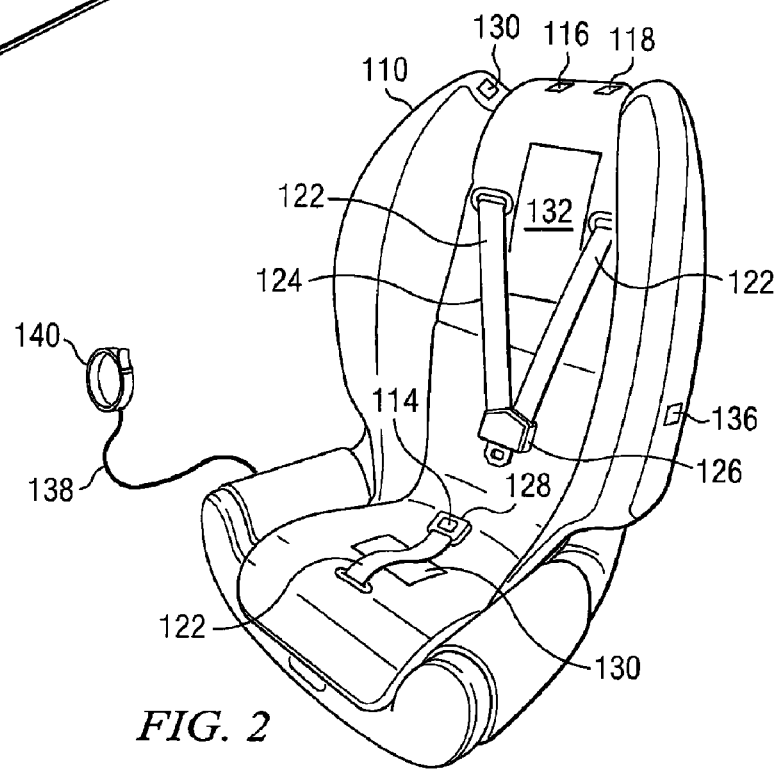
FIG. 2 illustrates an isometric view of the child safety seat of FIG. 1.

FIG. 2 illustrates a more detailed isometric view of an example embodiment of child safety seat 110 including a presence sensor 114, a proximity sensor 116, transmitter 118, a temperature sensor 130, a temperature control unit 132, and a computing device 136 operable to coordinate the operation of one or more of these components as well as a restraint 124 that includes a latch 126 and a buckle 128.

Restraint 124 may be any device or fixture of hardware or combination of such devices or fixtures operable to restrain child 112 in child safety seat 110. In the illustrated embodiment, restraint 124 includes a lower strap 122 coupled to latch 126 and configured to fit between child 112's legs as well as a pair of upper straps 122 coupled to buckle 128 and configured to fit over child 112's shoulders. To restrain child 112 in child safety seat 110, a caregiver may fasten latch 126 into buckle 128 after placing lower strap 122 between child 112's legs and upper straps 122 over child 112's shoulders.

Depending upon the design of child safety seat 110, restraint 124 may include any suitable number and configuration of straps 122, latches 126, and buckles 128 operable to restrain child 112 in child safety seat 110. For example, restraint 124 may include a first latch and buckle set configured to fasten around the upper torso of child 112 and a second latch and buckle set configured to fasten around the lower torso of child 112 and between the legs of child 112. In particular embodiments, either latch 126 or buckle 128 may be incorporated directly into the body of child safety seat 110 without the need for a strap 122. One of ordinary skill in the art will appreciate that the present disclosure contemplates any suitable configuration of restraint 124 including more, less, or different components than those described above to restrain child 112 in child safety seat 110.

Presence sensor 114 may be any component of hardware or software or combination of two or more such components capable of detecting the presence of a child 112 in child safety seat 110. In the illustrated embodiment, presence sensor 114 is incorporated into a buckle 128 of restraint 124. When restraint 124 is closed (e.g., when buckle 128 is fastened to latch 126), child safety seat 110 may determine that child 112 is present in child safety seat 110.

In another embodiment, system 100 may further include a bracelet 140 to be worn by child 112 and a flexible cord 138 extending from child safety seat 110. The first end of flexible cord 138 may be couple to child safety seat 110 and the second end of flexible cord may be configured to removeably couple to bracelet 140. Presence sensor 114 may be an electrical connector incorporated into the second end of flexible cord 138 configured to detect the presence of a child 112 in child safety seat 110 when flexible cord 138 is attached to bracelet 140. Alternatively, bracelet 140 may be wireless and may wirelessly communicate with proximity sensor 116 to enable proximity sensor 116 to determine when bracelet 140 is outside of a localized area (e.g., one foot) around child safety seat 110. When bracelet 140 is within the localized area, child safety seat 110 may determine that child 112 is present in child safety seat 110.

In yet another embodiment, presence sensor 114 may be a weight sensor 130. When weight sensor 130 detects a weight in excess of a predefined threshold weight, child safety seat 110 may determine that child 112 is present in child safety seat 110.

One of ordinary skill in the art will appreciate that the above-described embodiments of presence sensor 114 are presented for the sake of explanatory simplicity and will further appreciate that the present disclosure contemplates the use of any suitable sensor or combination of sensors to detect the presence of child 112 in child safety seat 110.

In particular embodiments, child safety seat 110 may use presence information from presence sensor 114 in conjunction with proximity information from proximity sensor 116 to determine whether child 112 has been left unattended in child safety seat 110. For example, when presence sensor 114 determines that child 112 is present in child safety seat 110, and proximity sensor 116 determines that wireless receiver 150 (e.g., carried by the caregiver) is located outside of the predefined distance of child safety seat 110, child safety seat 110 may alert the caregiver to return to child safety seat 110 to check on child 112 by issuing wireless signal 120.

To process information, child safety seat 110 may include a computing device 136 having one or more processors and a memory operable to store and execute logic for coordinating the functionality of the various components of child safety seat 110 to provide some or all of the computing functionality described herein.

In particular embodiments, child safety seat 110 may include a temperature sensor 130 operable to determine an ambient temperature surrounding child safety seat 110 and a temperature control unit 132 (e.g., a seat heater and/or cooler) operable to adjust a temperature of all or a portion of child safety seat 110. In an example situation, when temperature sensor 130 detects an ambient temperature around child safety seat 110 that occurs outside of a predetermined temperature range, temperature sensor 130 may instruct temperature control unit 132 (e.g., using computing device 136) to alter the temperature of child safety seat 110 if child safety seat 110 further determines that child 112 has been left unattended in child safety seat 110.

Temperature sensor 130 may be any component of hardware or software or combination of two or more such components operable to detect an ambient temperature around child safety seat 110. Furthermore, computing device 136 may be operable to compare a current ambient temperature received from temperature sensor 130 against a predefined temperature range (e.g., a range of temperatures determined to be safe for child 112) to determine whether the ambient temperature is potentially dangerous to child 112.

Temperature control unit 132 may be any device operable to adjust a temperature of child 112 in child safety seat 110. As an example and not by way of limitation, temperature control unit 132 may be a fan, a thermoelectric device, or any other device or combination of devices operable to adjust a temperature of child 112 in child safety seat 110. Depending upon design, temperature control unit 132 may be operable to either raise or lower the temperature of child 112. Temperature control unit 132 may function as a safety measure to regulate the temperature of child 112 in the presence of dangerous temperatures, for example, in the cabin of a vehicle left in the sun. Furthermore, depending upon the design of child safety seat 110, temperature control unit 132 may be triggered when child safety seat 110 determines that child 112 has been left unattended and temperature sensor 130 detects a dangerous temperature level.

In particular embodiments, one or more components of child safety seat 110 may be powered by a power source included in child safety seat 110 such as a battery. Depending upon design, child safety seat 110 may include a solar panel configured to supply power to the battery. For instance, the solar panel may be placed in an area of a vehicle which receives a high amount of direct sunlight, such as on the dashboard. Power may then be transmitted from the solar panel to the battery through a wire that connects child safety seat 110 to the solar panel. In particular embodiments, child safety seat 110 may draw power directly from a vehicle, for example, using a power connector that plugs into a cigarette lighter of the vehicle.

In particular embodiments, child safety seat 110 may further include a battery sensor configured to monitor the amount of power remaining in the battery of child safety seat 110. The battery sensor may further be coupled to a power level indicator operable to notify an owner of child safety seat 110 that the power level in the battery is running low. As an example and not by way of limitation, the power indicator may alert the owner that the power level in the battery is low by means of a visual indicator such as a flashing light or a speaker which emits an audible alert. Wireless receiver 150 may also include a power sensor operable to monitor the amount of power remaining in the battery of wireless receiver 150. The power sensor in wireless receiver 150 may be coupled to a power level indicator in wireless receiver 150 operable to notify the owner of wireless receiver 150 that the power in the battery or wireless receiver 150 is running low.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. A child safety seat system, comprising a child safety seat, a proximity sensor, a presence sensor, a transmitter, a temperature sensor, and a temperature control unit wherein:

the proximity sensor is configured to detect when a wireless receiver is located outside a predefined distance of the child safety seat;

the presence sensor comprises:
 a bracelet configured to be worn by a person; and
 a flexible cord comprising:
  a first end configured to removeably attach to the bracelet and detect the presence of the person based on whether the first end of the flexible cord is attached to the bracelet; and
  a second end attached to the child safety seat, the second end configured to signal the presence of the person to the transmitter;

the transmitter is configured to transmit a wireless signal to the wireless receiver when the presence sensor detects the presence of a person in the child safety seat and the wireless receiver is located outside the predefined distance, the wireless signal configured to cause the wireless receiver to generate an alert;

the temperature sensor is configured to monitor an ambient temperature surrounding the child safety seat; and the temperature control unit is configured to adjust a temperature of the child safety seat when the temperature sensor detects a temperature that occurs outside a predetermined temperature range, the presence sensor detects the presence of a person in the child safety seat, and the wireless receiver is located outside the predefined distance.

2. The system of claim 1, wherein the wireless signal comprises a cellular communication signal and the wireless receiver comprises a cellular device.

3. The system of claim 2, wherein the wireless signal comprises a Short Message Service ("SMS") text message.

4. The system of claim 1, wherein the temperature control unit comprises a thermoelectric module incorporated into the child safety seat.

5. The system of claim 1, wherein the temperature control unit comprises a cooling fan coupled to the child safety seat.

6. The system of claim 1, further comprising the wireless receiver, the wireless receiver comprising a keychain fob.

7. A method of using a child safety seat system comprising the steps of:

detecting when a wireless receiver is located outside a predefined distance of the child safety seat using a proximity sensor;

detecting a presence of a person in the child safety seat using a presence sensor based on whether a first end of a flexible cord is attached to a bracelet worn by the person;

signaling the presence of the person to a transmitter of the child safety seat system from a second end of the flexible cord attached to the child safety seat has been inserted between the word;

transmitting a wireless signal to the wireless receiver using the transmitter when the presence sensor detects the presence of a person in the child safety seat and the wireless receiver is located outside the predefined distance, the wireless signal configured to cause the wireless receiver to generate an alert;

monitoring an ambient temperature surrounding the child safety seat using a temperature sensor; and adjusting a temperature of the child safety seat using a temperature control unit incorporated in to the child safety seat when the temperature sensor detects a temperature that occurs outside a predetermined temperature range, the presence sensor detects the presence of a person in the child safety seat, and the wireless receiver is located outside the predefined distance.

8. The method of claim 7, wherein the temperature control unit comprises a thermoelectric module.

9. The method of claim 7, wherein the wireless signal comprises a cellular communication signal and the wireless receiver comprises a cellular device.

10. The system of claim 9, wherein the wireless signal comprises a Short Message Service ("SMS") text message.

* * * * *